(12) United States Patent
Broady et al.

(10) Patent No.: US 12,263,638 B2
(45) Date of Patent: *Apr. 1, 2025

(54) TECHNIQUES FOR BUILD PLATFORM PART RELEASE IN ADDITIVE FABRICATION AND RELATED SYSTEMS AND METHODS

(71) Applicant: Formlabs, Inc., Somerville, MA (US)

(72) Inventors: Craig Broady, Somerville, MA (US); Gurshan Deol, Burlington (CA); Gagandeep Singh, Mississauga (CA)

(73) Assignee: Formlabs, Inc., Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,688

(22) Filed: Mar. 4, 2024

(65) Prior Publication Data

US 2024/0286353 A1 Aug. 29, 2024

Related U.S. Application Data

(63) Continuation of application No. 17/156,925, filed on Jan. 25, 2021, now Pat. No. 11,926,096, which is a
(Continued)

(51) Int. Cl.
*B29C 64/245* (2017.01)
*B29C 64/135* (2017.01)
(Continued)

(52) U.S. Cl.
CPC .......... *B29C 64/245* (2017.08); *B29C 64/135* (2017.08); *B33Y 30/00* (2014.12);
(Continued)

(58) Field of Classification Search
None
See application file for complete search history.

(56) References Cited

U.S. PATENT DOCUMENTS

| 5,253,012 A | 10/1993 | Chiba et al. |
| 10,710,303 B2 | 7/2020 | Broady et al. |

(Continued)

FOREIGN PATENT DOCUMENTS

| CN | 103167946 A1 | 6/2013 |
| CN | 104191625 A1 | 12/2014 |

(Continued)

OTHER PUBLICATIONS

International Search Report and Written Opinion for International Application No. PCT/US2017/065136, dated Mar. 6, 2018.
(Continued)

*Primary Examiner* — Timothy Kennedy
(74) *Attorney, Agent, or Firm* — Michael J. Attisha; Greenberg Traurig, LLP (57) ABSTRACT

According to some aspects, an additive fabrication device and a build platform suitable for use within an additive fabrication device are provided. The build platform may include a build surface on which material may be formed by the additive fabrication device when the build platform is installed within the additive fabrication device. According to some embodiments, the build platform may include a flexible build layer and at least one removal mechanism configured to be actuated to apply a force to the flexible build layer. Such actuation may cause the flexible build layer to deform, thereby enabling separation of material adhered to the build surface from the build platform. According to some embodiments, the build platform may comprise a restorative mechanism that acts to return the flexible build layer to a flat state so that subsequent additive fabrication may form material on a flat build surface.

10 Claims, 6 Drawing Sheets

Related U.S. Application Data continuation of application No. 16/927,150, filed on Jul. 13, 2020, now Pat. No. 10,899,077, which is a continuation of application No. 15/835,163, filed on Dec. 7, 2017, now Pat. No. 10,710,303.

(51) Int. Cl.
  *B33Y 30/00* (2015.01)
  *B33Y 40/20* (2020.01)
  *B29C 64/124* (2017.01)
  *B29C 64/153* (2017.01)

(52) U.S. Cl.
  CPC ............ *B33Y 40/20* (2020.01); *B29C 64/124* (2017.08); *B29C 64/153* (2017.08)

(56) References Cited

U.S. PATENT DOCUMENTS

| | | | |
|---|---|---|---|
| 10,899,077 | B2 | 1/2021 | Broady et al. |
| 11,840,017 | B2 | 12/2023 | Frykman et al. |
| 11,926,096 | B2 | 3/2024 | Broady et al. |
| 2005/0173855 | A1 | 8/2005 | Dunn et al. |
| 2011/0241947 | A1 | 10/2011 | Scott et al. |
| 2013/0242317 | A1 | 9/2013 | Leavitt et al. |
| 2013/0270746 | A1 | 10/2013 | Elsey |
| 2015/0145174 | A1 | 5/2015 | Comb |
| 2016/0052207 | A1 | 2/2016 | Bloom |
| 2016/0288427 | A1 | 10/2016 | Foley et al. |
| 2016/0332387 | A1 | 11/2016 | Jondal et al. |
| 2017/0259507 | A1 | 9/2017 | Hocker |
| 2017/0297320 | A1 | 10/2017 | Swanson |
| 2018/0043636 | A1 | 2/2018 | Flannigan et al. |
| 2019/0030806 | A1 | 1/2019 | Herman et al. |
| 2019/0047213 | A1 | 2/2019 | Stadlmann |
| 2019/0176393 | A1 | 6/2019 | Broady et al. |
| 2020/0156317 | A1 | 5/2020 | Van Esbroek et al. |
| 2020/0368966 | A1 | 11/2020 | Broady et al. |
| 2022/0410477 | A1 | 12/2022 | Frykman et al. |
| 2024/0286353 | A1 | 3/2024 | Broady et al. |

FOREIGN PATENT DOCUMENTS

| | | |
|---|---|---|
| CN | 105189092 A1 | 12/2015 |
| JP | 2000211031 A1 | 8/2000 |
| WO | 2016033286 A1 | 3/2016 |
| WO | 2016177893 A1 | 11/2016 |
| WO | 2017161398 A1 | 9/2017 |

OTHER PUBLICATIONS

International Search Report and Written Opinion for International Application No. PCT/US2017/065136, mailed Jun. 18, 2020.
Extended European Search Report dated Jun. 25, 2021 in connection with European Application No. 17934081.5.
International Search Report and Written Opinion for International Application No. PCT/US2022/034269, dated Sep. 15, 2022.

TECHNIQUES FOR BUILD PLATFORM PART RELEASE IN ADDITIVE FABRICATION AND RELATED SYSTEMS AND METHODS

CROSS REFERENCE TO RELATED APPLICATIONS

The present application is a continuation under 35 U.S.C. § 120 of U.S. application Ser. No. 17/156,925, filed Jan. 25, 2021, which claims the benefit as a continuation under 35 U.S.C. § 120 of U.S. application Ser. No. 16/927,150 (now U.S. Pat. No. 10,899,077), filed Jul. 13, 2020, which claims the benefit as a continuation under 35 U.S.C. § 120 of U.S. application Ser. No. 15/835,163 (now U.S. Pat. No. 10,710,303), filed Dec. 7, 2017, each of which is hereby incorporated by reference in its entirety.

FIELD OF INVENTION

The present invention relates generally to systems and methods for separating an additively fabricated part from a build surface.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a build surface upon which the object is built.

In one approach to additive fabrication, known as stereolithography, solid objects are created by successively forming thin layers of a curable polymer resin, typically first onto a build surface and then one on top of another. Exposure to actinic radiation cures a thin layer of liquid resin, which causes it to harden and adhere to previously cured layers or the bottom surface of the build surface.

SUMMARY

According to some aspects, an additive fabrication device configured to form layers of material on a build surface is provided, the additive fabrication device comprising a build platform comprising a rigid structure, a flexible layer attached to the rigid structure, wherein some, but not all, portions of the flexible layer are attached to the rigid structure, and wherein a surface of the flexible layer forms the build surface on which the additive fabrication device is configured to form layers of material, and at least one first mechanism configured to be actuated to apply a force to the flexible surface, thereby deforming at least part of the flexible surface away from the rigid structure.

According to some aspects, a build platform for an additive fabrication device is provided, the build platform comprising a mounting attachment configured to removably attach and detach the build platform to and from the additive fabrication device, a rigid structure coupled to the mounting attachment, a flexible layer attached to the rigid structure, wherein some, but not all, portions of the flexible layer are attached to the rigid structure, and at least one first mechanism configured to be actuated to apply a force to the flexible surface, thereby deforming at least part of the flexible surface away from the rigid structure.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

In additive fabrication, irrespective of the particular mechanism by which layers of material are formed, the material is usually formed on some kind of surface usually referred to as a "build surface." The build surface is typically part of a component of the additive fabrication device referred to as a "build platform." The build platform may, in some additive fabrication devices, be configured to move within the device so that material can be deposited at an appropriate position on the build surface. For instance, build platforms are frequently configured to move in a vertical direction between formation of each layer so that a new layer may be formed on top of a previously-formed layer.

Typically, a first layer of material is formed on the build surface as an initial step of the formation process. The first layer may provide stability for subsequent formation of additional layers and/or may provide a layer through which a part being formed may be adhered to the build surface. The degree to which the first layer and the build surface adhere to one another may depend on multiple factors, such as the material used to form the layer and the geometries of the build platform and/or the first layer. In some cases, the first layer of the part being fabricated may have an area that is sufficiently small that the adhesive forces between the first layer and the build surface during fabrication may be insufficient to retain contact between the part and build surface, which may lead to the part separating partially or completely from the build surface. Assuming the part successfully adheres to the build surface throughout the fabrication process, however, it is removed from the build surface as a post-processing step subsequent to fabrication of the part being completed.

In addition to removal of a part from a build surface, additional post-processing steps may be performed subsequent to fabrication of the part. In some use cases, support material may have been formed for the purpose of mechanically support overhanging or otherwise unsupported structures of the part during its fabrication, and this excess material may be removed (e.g., using a knife or other cutting tool). In some use cases, cleaning of a part may be performed after fabrication. For example, when using a photopolymer-based additive fabrication device it may be beneficial to immerse a newly formed part into a cleaning solution such as isopropyl alcohol to remove excess uncured or partially cured resin from surfaces of the newly formed part. In some use cases, the surface of a fabricated part may be altered or finished using techniques that etch or otherwise affect the surface characteristics of the part. For example, parts fabricated using a fused filament additive fabrication technology may be finished using a vapor polishing technique (e.g., using acetone vapor) which causes the surface of the part to be smoothed and appear glossy. In some use cases, a part may be immersed in water and/or an acid/alkaline solution (e.g., sodium hydroxide) to dissolve a portion of the part.

Performing post-processing steps, including but not limited to those discussed above, may, however, risk damage to the fabricated part. In many cases, fabricated parts can be fragile and may include features that could be damaged and/or removed by certain post-processing steps. For example, a user removing a support structure from a part or cleaning a part may exert a sufficient force upon the part (e.g., through holding or otherwise) that the force causes the part to be damaged. In some cases, removing a part from a build surface to which it is adhered may cause damage to the part via the forces that are necessarily exerted on the part in order to remove it. In some extreme cases, the use of a scraping or cutting tool to remove a part from a build surface may result in injury to a user. For example, if the adhesive forces between a fabricated part and a build surface are sufficiently high, the user may have to exert considerable force in order to separate the part from the build surface, which increases the risk of injury.

As a result of these and other challenges with post-processing, it may be desirable to reduce adhesive forces between the part and the build platform during fabrication to make it easier to perform post-processing of parts after fabrication. However, such a reduction may cause a part to separate partially or fully from the build platform during fabrication, typically causing the fabrication process to fail. Consequently, conventional processes and devices retain high adhesive forces between the part and the build platform to ensure successful fabrication yet resulting in post-processing challenges such as the aforementioned examples.

The inventors have recognized and appreciated that removal of a part from a build surface may be performed using one or more removal mechanisms that, when actuated, deform the build surface thereby causing the part to separate from the build platform. The build surface may be the surface of a flexible build layer that is fixed to the build platform in part whilst some portions of the build layer may be free to move relative to a base portion of the build platform. For example, a build layer may be fixed to the build platform around its perimeter (or some portion of its perimeter) whilst an interior region of the build layer may not be affixed to the build platform and may be free to move away from the base. The removal mechanism may include any mechanism that, when actuated, applies a force onto the build layer in a direction away from a base of the build platform to which the build platform is attached. The removal mechanism thereby causes the build layer (and thereby the build surface) to deform, which in turn causes a part adhered to the build surface to separate from it.

According to some embodiments, a removal mechanism may comprise one or more elements that can be moved towards and away from the build surface, such that actuating the mechanism causes the one or more elements to push at least a portion of the build surface away from the base to which the build surface is attached. Such actuation may be manual, such as via a handle that can be pushed by a user holding the build platform, and/or may be automatic, such as via one or more motors that operate to move the elements to push the build surface.

According to some embodiments, a build platform may include one or more mechanisms, in addition to the removal mechanism(s), that apply a restorative force to the build layer. Since a flat build surface is desirable for fabrication, such a restorative mechanism may act to return the build surface to a flat state after the removal mechanism is used to deform the build surface to remove a part. An illustrative use case for a build platform so configured may, therefore, comprise acts of fabricating a part on a flat build surface of a build platform, actuating a removal mechanism to deform the build layer and thereby separate the part from the build platform, then manipulating the removal mechanism such that its force upon the build layer is sufficiently reduced that a restorative mechanism can act to return the build surface to a flat state. A restorative mechanism therefore includes any elements of the build platform that act to apply a force onto the build layer to return the build surface to a flat state.

In some embodiments, as an alternative to a restorative mechanism, the build layer may be formed from material that naturally returns to a flat state when the removal mechanism is suitable actuated away from the build surface. For example, the build layer may comprise a rigid material that buckles when force is applied to it by the removal mechanism, but that flexes back to its original state when the removal mechanism stops applying such a force.

According to some embodiments, a build platform of an additive fabrication device may be removable from the device. In some cases, the build platform containing one or more removal mechanisms may be configured to be attached to portions of the additive fabrication device during fabrication and then removed from the device after fabrication. Separation of a part from the build platform may therefore, in at least some cases, occur when the build platform is separated from the additive fabrication device.

Following below are more detailed descriptions of various concepts related to, and embodiments of, techniques for separating an additively fabricated part from a build surface. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein. In particular, while the following describes embodiments in which removal mechanisms and/or restorative mechanisms may be located within a build platform, it may be appreciated that one or more components of such mechanisms may be located within an additive fabrication device in proximity to the build platform and the same results achieved so long as the appropriate forces, described below, can be directed to the build surface.

FIGS. 1A-1D illustrate schematic views of a build platform suitable for use in an additive fabrication device, according to some embodiments. In the example of FIGS. 1A-1D, a build platform includes a rigid body 101 coupled to a mounting attachment 102. In each of FIGS. 1A-1D, a build layer is affixed to the rigid body 101 at ends 107. The build surface of each illustrated build platform is the uppermost surface of the build layer.

Figure 1A:
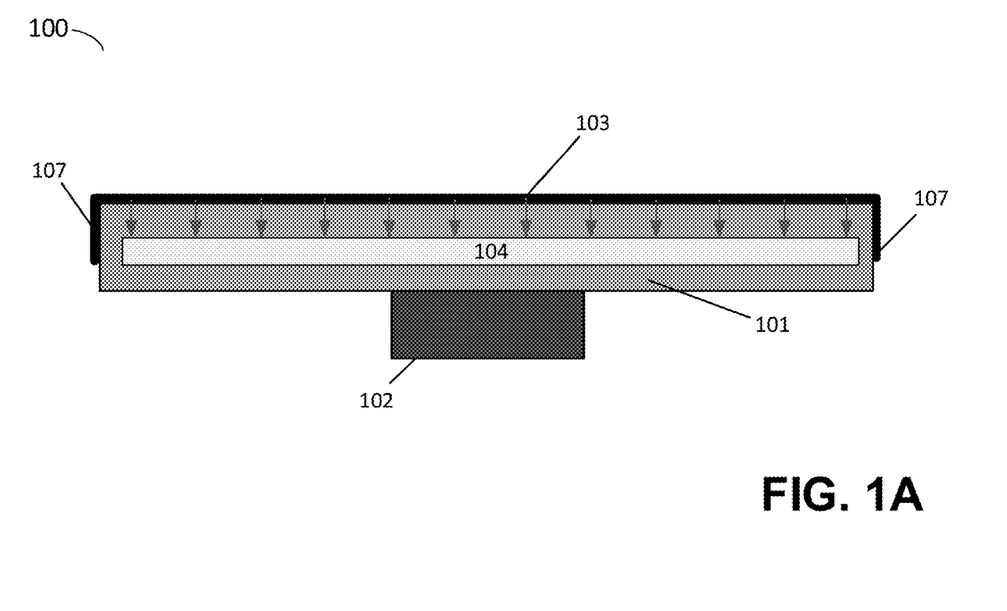
FIGS. 1A-1D illustrate a schematic view of a build platform suitable for use in an additive fabrication device, according to some embodiments.
Figure 1B:
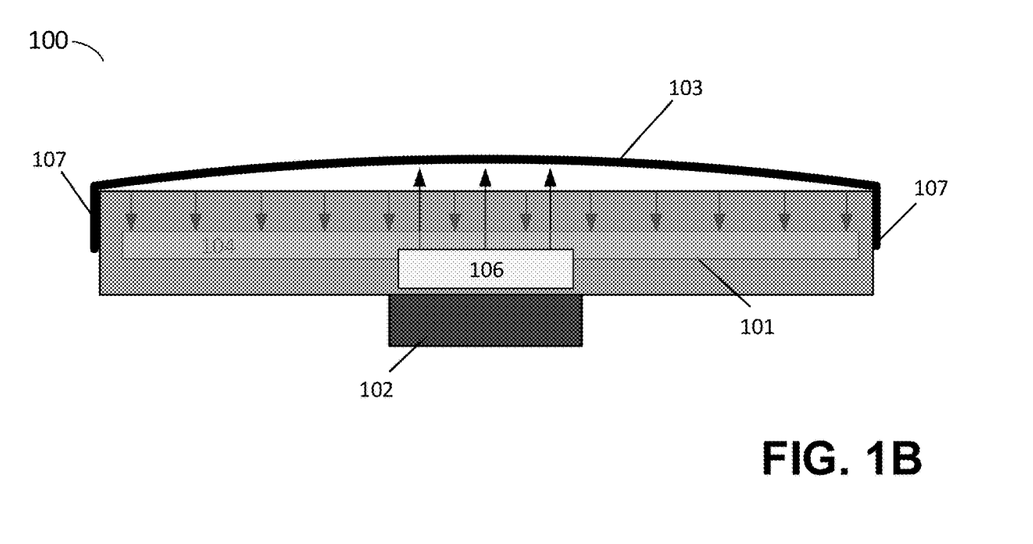

FIG. 1A illustrates a build platform in an initial configuration wherein build layer 103 is flat (or substantially flat). FIG. 1B illustrates a second configuration of the build platform in which the build layer 103 is deformed by the application of force by removal mechanism 106. In each of FIGS. 1A and 1B, a restorative mechanism 104 applies a force to the build layer.

Figure 1C:
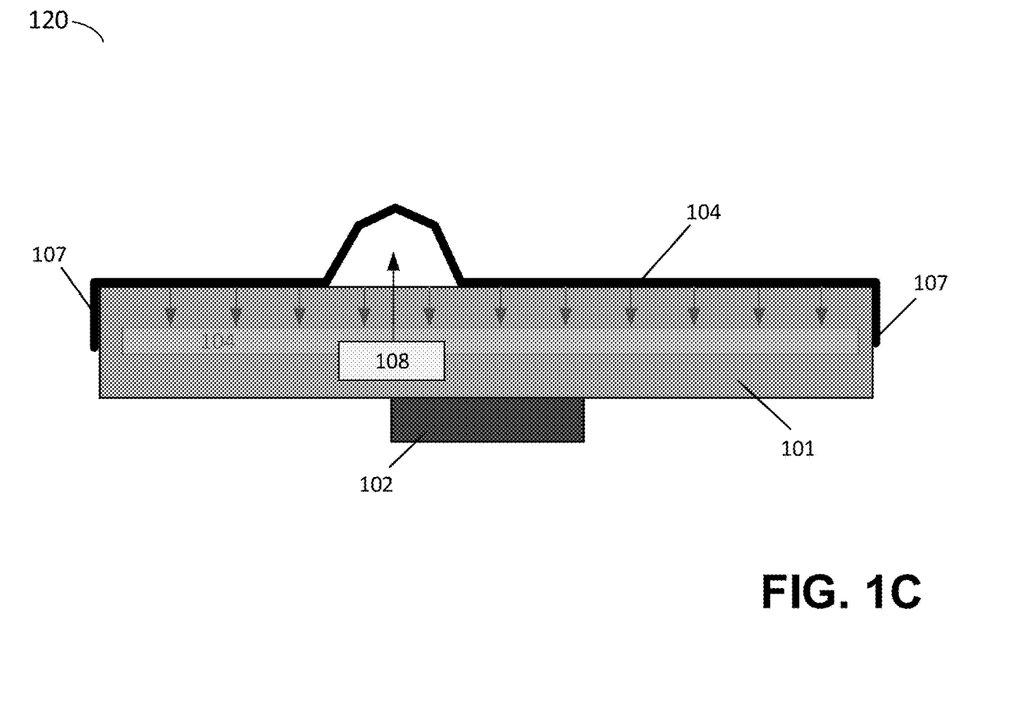

FIG. 1C illustrates an alternate configuration of a build layer 104 subsequent to application of force by removal mechanism 108. Whereas the build layer 103 shown in FIG. 1B deformed across its surface (e.g., buckled) when the removal mechanism 106 applied a force to the build layer, the build layer 104 shown in FIG. 1C deforms primarily in a limited region of the build surface, as shown.

Figure 1D:
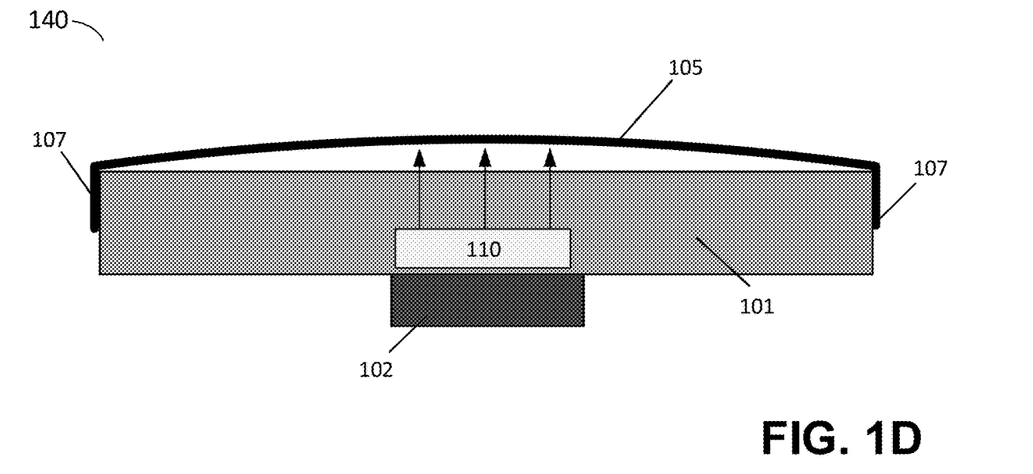

FIG. 1D illustrates another alternate configuration of a build layer 105 subsequent to application of force by removal mechanism 110. In the example of FIG. 1D, no restorative mechanism is included, accordingly the build layer 105 may be configured to return to a flat (or substantially flat) state such as that depicted in FIG. 1A once the force applied by the removal mechanism 110 drops sufficiently low for internal forces within the build layer to cause the build layer to deform into a flat (or substantially flat) state.

Each of the build platforms shown in FIGS. 1A-1D may be utilized within an additive fabrication device by arranging the build platform such that material is formed on the build surface of the build platform (i.e., the exposed upper surface of the build layer). In some embodiments, the build platform may be attached to the additive fabrication device via the mounting attachment 102.

According to some embodiments, the build layer 103, 104 or 105 may be formed from one or more materials such that the build layer is flexible or otherwise deformable. In some embodiments, build layer 103, 104 and/or 105 may comprise a ferromagnetic layer, such as spring steel, such that the build layer is a flexible sheet of material. In some embodiments, additional layers may be added to such a ferromagnetic layer; for example, protective coatings and/or other materials may be disposed upon the ferromagnetic layer that modify forces of adhesion between the build surface and material formed on the build surface.

In the example of FIGS. 1A-1C, forces may be applied to a build layer (e.g., build layer 103 and/or 104) by restorative mechanism 104, which act to cause the build surface to adopt a substantially conformal shape. In some cases, such a shape may result in the build surface being flush against the rigid body 101. According to some embodiments, restorative forces applied by restorative mechanism 104 may be applied across any portion of the build layer, such as the entire surface or only a portion of the build surface on which material is expected to be formed during additive fabrication. In some embodiments, the restorative mechanism 104 may comprise a single restorative force producing element (e.g., a single magnet) or may comprise multiple restorative force producing elements that each produce restorative forces, which need not necessarily be of the same magnitude nor produced by the same means (e.g., the restorative mechanism 104 may comprise any number of magnets and/or springs coupled to the build layer).

Irrespective of how the restorative mechanism applies force to the build layer, according to some embodiments, the restorative mechanism may apply force to the build layer such that there is no substantial deformation of the build surface away from the rigid body 101 during additive fabrication process. That is, forces applied by the restorative mechanism to the build layer may be sufficiently high to overcome forces applied to the build surface in an opposing direction during fabrication.

According to some embodiments, a build layer (e.g., build layer 103 and/or 104) may be attracted and/or attached to the rigid body 101 base by restorative mechanism 104 using any number of techniques, including magnetic, vacuum, adhesive and/or mechanical forces. For example, the restorative mechanism 104 may be coupled to the build layer 103 or to the build layer 104 via one or more springs, magnetic clamps, magnets, low pressure volumes, adhesives, or combinations thereof. In some embodiments in which a build layer (e.g., build layer 103, 104 and/or 105) comprises one or more ferromagnetic materials, a restorative mechanism may preferably comprise one or more magnets, such as one or more sheet magnets.

According to some embodiments, a build layer (e.g., build layer 103, 104 and/or 105) may be attached to rigid body 101 at one or more locations so long as at least some of the build layer is free to move or deform such that the build surface changes shape. In the examples of FIGS. 1A-1D, the build layers are attached to the rigid body at ends 107. Irrespective of where the build layer is attached to the rigid body, in some embodiments, such attachment may be via mechanical fasteners, magnets and/or adhesives. In some embodiments, a build layer may be removably attached to rigid body 101 at one or both ends 107. For instance, one or more ends 107 of the rigid body may include a magnetic element of sufficient strength to hold the build layer in place during fabrication whilst allowing a user to separate the build layer from the rigid body via application of force.

In some embodiments, lifting of one end of the build layer may result in a progressive "peeling" of the build layer away from the rigid body 101 that begins at the lifted end and that progresses across the rigid body towards an attached edge. This progressing peeling may tend to cause the build layer to adopt a bend at the propagating separation boundary, thereby potentially separating a part from the build layer.

Figure 2A:
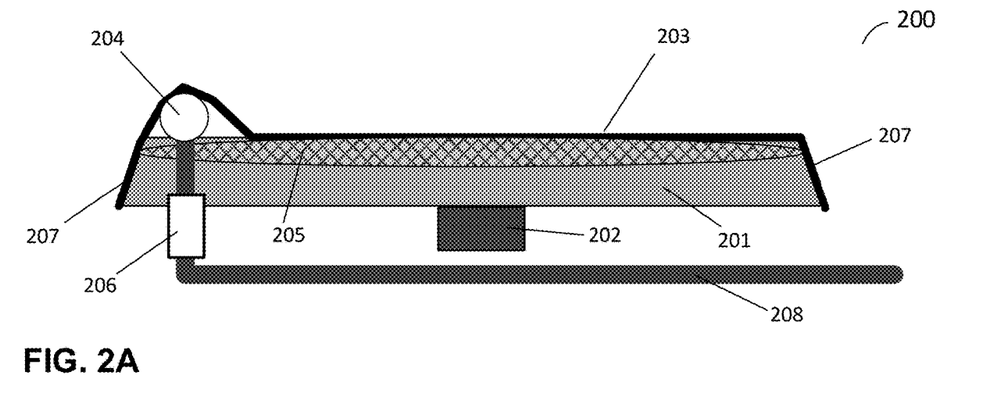
FIGS. 2A-2C illustrate a schematic view of a build platform in which a roller mechanism actuates to apply a force to a build plate, according to some embodiments.
Figure 2B:
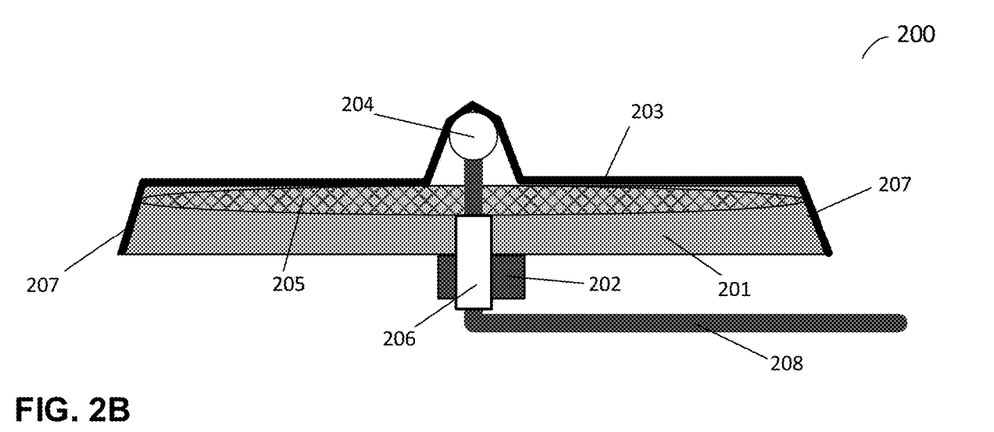
Figure 2C:
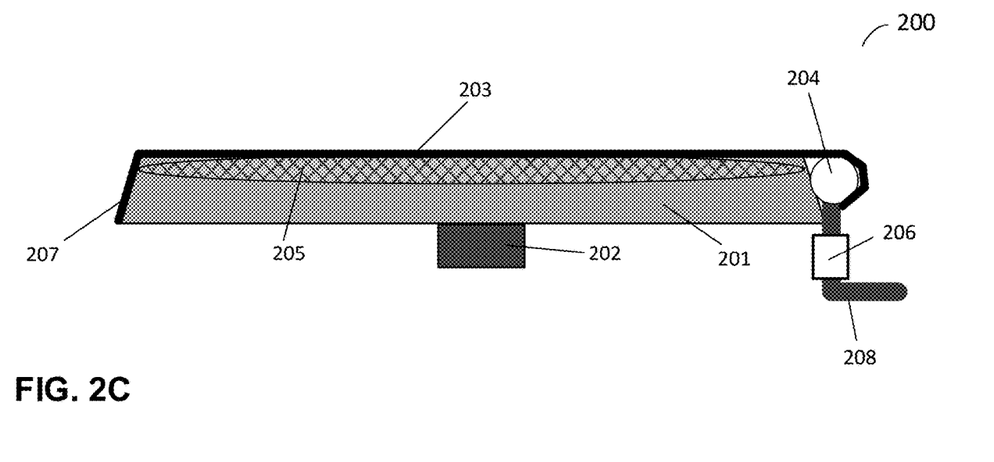

FIGS. 2A-2C illustrate a schematic view of a build platform in which the removal mechanism includes a roller which, when actuated, applies a force to a build layer, according to some embodiments. As shown in the example of FIGS. 2A-2C, a build platform 200 comprises a rigid body 201 to which a build layer 203 is affixed at ends 207. A mounting attachment 202 is coupled to the rigid body to allow the illustrative build platform 200 to be secured to an additive fabrication device. The build platform 200 further includes a magnetic element 205 that produces an attractive force upon the build layer 203.

When release of a part attached to the build layer 203 is desired, the roller removal mechanism 204 may be moved between the build layer 203 and the rigid body 201. In the example of FIGS. 2A-2C, the roller 204 is connected to a frame 208 which is in turn connected to a source of linear motion. This source of motion may be generated manually by a user and/or automatically using, for example, one or more motors or other actuators.

As it moves, the roller 204 may cause an area of the build layer 203 to move away from the rigid body 201 so as to accommodate the space taken by the roller 204. The geometry of this region, or bend, depends upon the degree of flexibility of the build layer 203, the geometry of the roller 204 and, as discussed below, the force with which the roller 204 presses up against the build layer 203. Portions of the build layer 203 outside of the region influenced by the roller 204 may remain conformal to the rigid body 201, held in place, at least in part, by forces such as those caused by magnetic element 205.

As shown in the example of FIG. 2B, the region in which the build layer 203 bends may be moved across the build layer as the roller 204 is moved. As discussed above, the introduction and progression of the bend region may tend to exert force(s) on material (e.g., a part) that is bonded to the build layer 203. Such forces may be effective in breaking such bonds without introducing unwanted distortions or risks of defects to the part, particular in embodiments wherein parts may be attached to the build layer 203 via a sacrificial layer known as a raft.

The inventors have observed that there may be a relationship between the radius of curvature of the bending portion of the build layer 203 and the ability of the transiting roller 204 to cause parts with smaller cross sectional attachment points onto the build layer to detach from the build layer. In particular, the amount of force generated by the motion of the roller 204 may be greatest when the part dimension along the axis of the bend is comparatively large as compared to the radius of curvature of the bend and smallest when the part dimension along that axis is comparatively small as compared to the radius of curvature. Accordingly, it may be advantageous to minimize the radius of curvature of the bend in some embodiments. For instance, the flexibility of the build layer may be increased so that the build layer more closely follows the shape of the roller, the roller's diameter may be reduced and/or the roller may be offset further from the rigid body 201.

In the example of FIGS. 2A-2C, a compressive mounting element 206 may be included in the mounting of a raised roller 204. This element serves to apply a force through the roller toward the build layer that changes as a function of the distance from the element 206 to the roller 204. Since it may be expected that it requires a greater force to displace build layer 203 close to its edges (as shown in FIG. 2A) than to displace the build layer towards its center (as shown in FIG. 2B), the compressive element allows the roller to extend toward the build layer until the upward force exerted by the compressive element 206 is equal to the downward force exerted by the displaced build layer 203. Accordingly, in the example of FIGS. 2A-2C, when approaching the midpoint of the rigid body 201, as shown in FIG. 2B, the roller 204 reaches its maximum height, deflecting the build layer 203. When approaching the edges of the rigid body 201, however, as shown in FIG. 2A, the roller 204 is situated closer to the rigid body compared with at the center because the forces that the build layer apply onto the roller toward the rigid body are greater at the edge than at the center. Such a mounting element may have advantages over altering the dimensions and/or position of the roller 204, and/or increasing the flexibility of the build layer 203. In some embodiments, the compressive mounting element 206 may comprise a compression spring and/or other type of spring.

According to some embodiments, compressive mounting element 206 may allow for convenient positioning of the roller 204 to allow for a fully flush build layer 203 when not in use, such as shown in FIG. 2C. As shown therein, the compressive element 205 allows for the roller 204 to be pushed below the primary plane of the build layer 203 and rigid body 201 by the forces exerted by the build layer 203 near its attachment point. Edges 207 may be further configured with a slope, curve, or other such features in order to guide the roller 204 into a recessed area of the rigid body 201 when moving towards the edge 207 and/or to guide the roller 204 away from such an area when moving towards the midpoint of the rigid body 201.

In some embodiments, frame 208 may be actuated in order to cause one or more parts to detach from the build layer 203. Such actuation may comprise any combination of automated, semi-automated or manual processes.

In some embodiments, the build platform may be mounted on or in a post-processing device configured to actuate the frame and may optionally perform other post-processing steps (e.g., cleaning a part on the build platform, performing additional curing or heating, etc.). The motion of the roller 204 discussed above may then be caused by one or more linear motion sources of the post-processing device that are connected to the frame 208. The success of such part removal may be further determined based upon the measurement, by the post-processing device, of the motion and/or motive force of the frame 208 in rigid connection to the roller 204. In particular, the presence of an object adhered to the build layer 203 may, in many instances, increase the amount of force required to move the separation member 204 across the area of the build layer 203 with such a part adhered. The post-processing device may then determine whether the part was successfully removed by detecting the force measurement and identify whether the force changed during separation, and if so, by how much. In some cases, the post-processing device may then provide feedback to a user and/or a connected device reporting whether the part was successfully removed.

In some embodiments, it may be particularly advantageous to actuate the roller 204 (e.g., by a post-processing device or otherwise) to move across the rigid body 201 and then reverse the motion to return it to a starting position. Forces and/or motion characteristics may then be compared between the two motions to determine if separation occurred during the prior step, as discussed above.

In some embodiments, whether a part was successfully removed from the build platform may be determined by a post-processing device based upon the weight of a part, wherein the part is automatically or semi-automatically removed onto a platform capable of measuring the weight of any materials deposited onto it (which may be part of the post-processing device or part of some other device). The movement of the roller 204 can thereby be repeated until the expected weight of the part is detected on such platform or until a threshold for user intervention or alternative processing is reached.

According to some embodiments, various spaces between elements shown in the example of FIGS. 2A-2C may be sealed to prevent or inhibit build material from entering such spaces. As one example, the inventors have recognized that there may be advantages in preventing build material (e.g., liquid photopolymer, powdered nylon, etc.) from entering into the void formed by the roller 204 or to otherwise enter the space between the build layer 203 and the rigid body 201. Accordingly, this space may be sealed in various ways against the intrusion of build material.

According to some embodiments, edges 207 may be sealed in various ways, including the use of adhesives or other bonding materials, compliant gaskets, and/or other techniques. According to some embodiments, filling of some gaps may be addressed by including side walls extending from the edges of the build layer 203 towards the rigid body 201. In some embodiments, such side walls may be left "open," with sufficient rigidity to form a region closed on five sides and displacing any build material away from the void between the rigid body 201 and build layer 203. In other embodiments, such side walls may connect with another enclosure, not shown here, in order to form a fully enclosed volume. In such embodiments, it may be further advantageous for side walls to be formed of a flexible and/or elastic material, such as an enclosing strip or skirt of polyethylene film, so as to allow for movement of the roller 204 and any associated frame 208 elements.

Figure 3A:
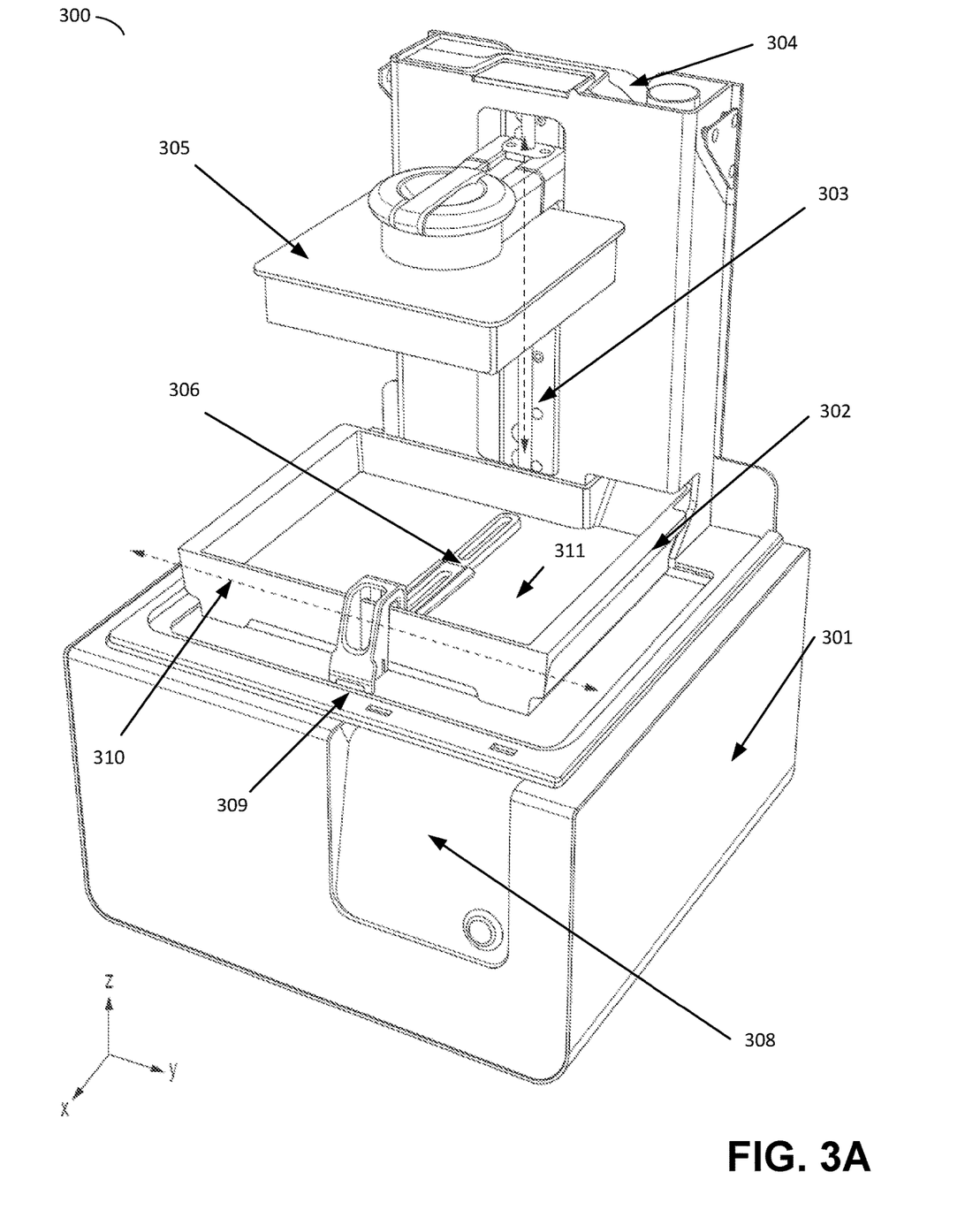
FIGS. 3A-B depict an illustrative stereolithographic additive fabrication device, according to some embodiments.
Figure 3B:
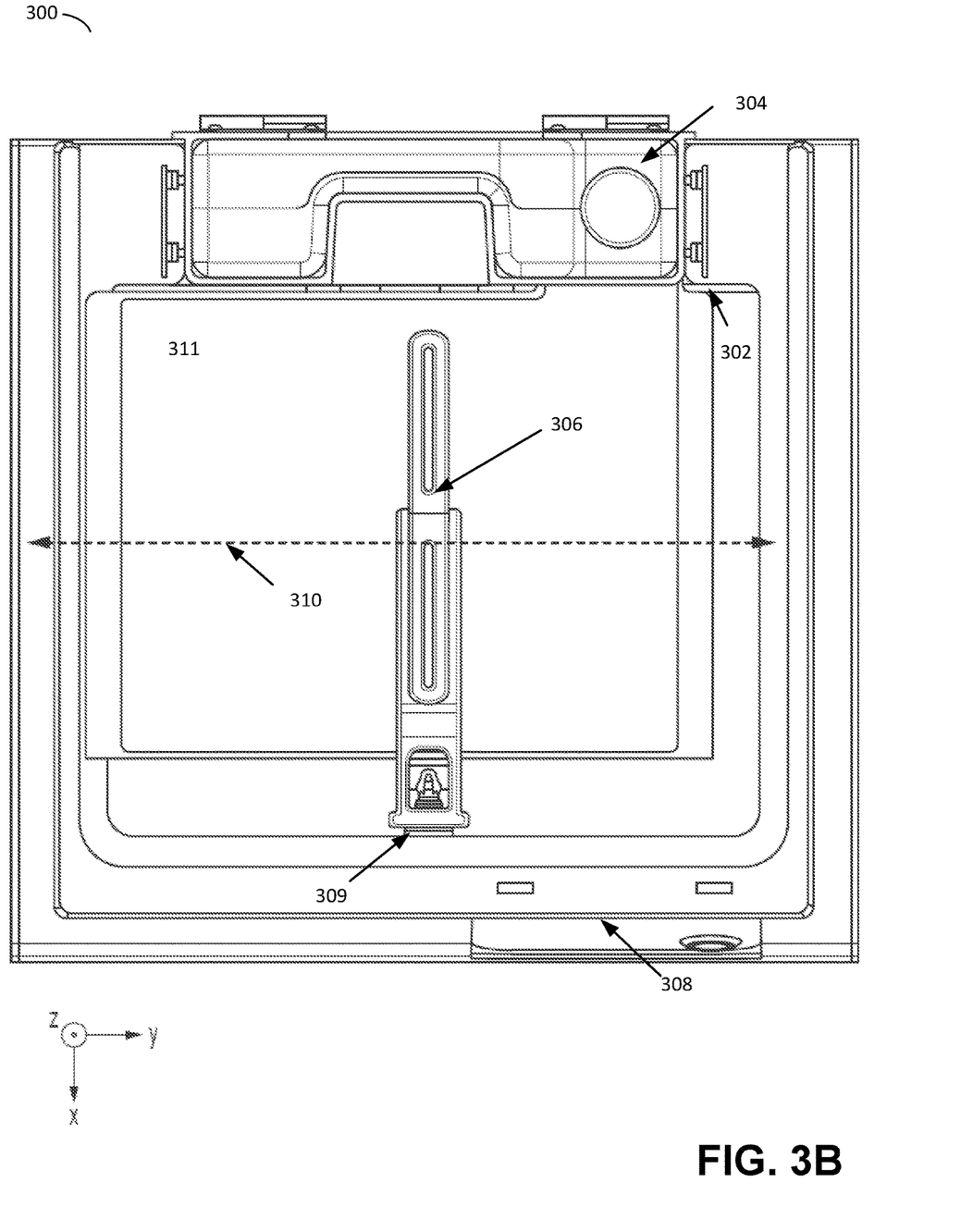

FIGS. 3A-B depict an illustrative additive fabrication device comprising a build platform configured as per any of the embodiments discussed above. Illustrative stereolithographic printer 300 comprises a support base 301, a display and control panel 308, and a reservoir and dispensing system 304 for storage and dispensing of photopolymer resin. The support base 301 may contain various mechanical, optical, electrical, and electronic components that may be operable to fabricate objects using the system. During operation, photopolymer resin may be dispensed from the dispensing system 304 into container 302.

Build platform 305 may be positioned along a vertical axis 303 (oriented along the z-axis direction as shown in FIGS. 3A-B) such that the bottom facing layer (lowest z-axis position) of an object being fabricated, or the bottom facing layer of build platform 305 itself, is a desired distance along the z-axis from the bottom 311 of container 302. The desired distance may be selected based on a desired thickness of a layer of solid material to be produced on the build platform or onto a previously formed layer of the object being fabricated. In the example of FIGS. 3A-3B, the build surface of the build platform 305 faces in the −z direction, towards the container 302.

According to some embodiments, build platform 100, 120, 140 or 200, as shown in FIGS. 1A, 1B, 1C and 2A-2C, respectively, may be employed in system 300 as build platform 305. In some embodiments, the build platform 305 may be removable from the printer 300. For instance, the build platform 305 may be attached to arm 315 (e.g., pressure fit or fastened onto) and may be removed from the printer so that a part attached to the build surface can be removed via the techniques described above.

In the example of FIGS. 3A-B, the bottom 311 of container 302 may be transparent to actinic radiation that is generated by a radiation source (not shown) located within the support base 301, such that liquid photopolymer resin located between the bottom 311 of container 302 and the bottom facing portion of build platform 305 or an object being fabricated thereon, may be exposed to the radiation. Upon exposure to such actinic radiation, the liquid photopolymer may undergo a chemical reaction, sometimes referred to as "curing," that substantially solidifies and attaches the exposed resin to the bottom facing portion of build platform 305 or to an object being fabricated thereon. FIGS. 3A-B represent a configuration of stereolithographic printer 301 prior to formation of any layers of an object on build platform 305, and for clarity also omits any liquid photopolymer resin from being shown within the depicted container 302.

Following the curing of a layer of material, build platform 305 may be moved along the vertical axis of motion 303 in order to reposition the build platform 305 for the formation of a new layer and/or to impose separation forces upon any bond with the bottom 311 of container 302. In addition, container 302 is mounted onto the support base such that the stereolithographic printer 301 may move the container along horizontal axis of motion 310, the motion thereby advantageously introducing additional separation forces in at least some cases. A wiper 306 is additionally provided, capable of motion along the horizontal axis of motion 310 and which may be removably or otherwise mounted onto the support base at 309.

Figure 4:
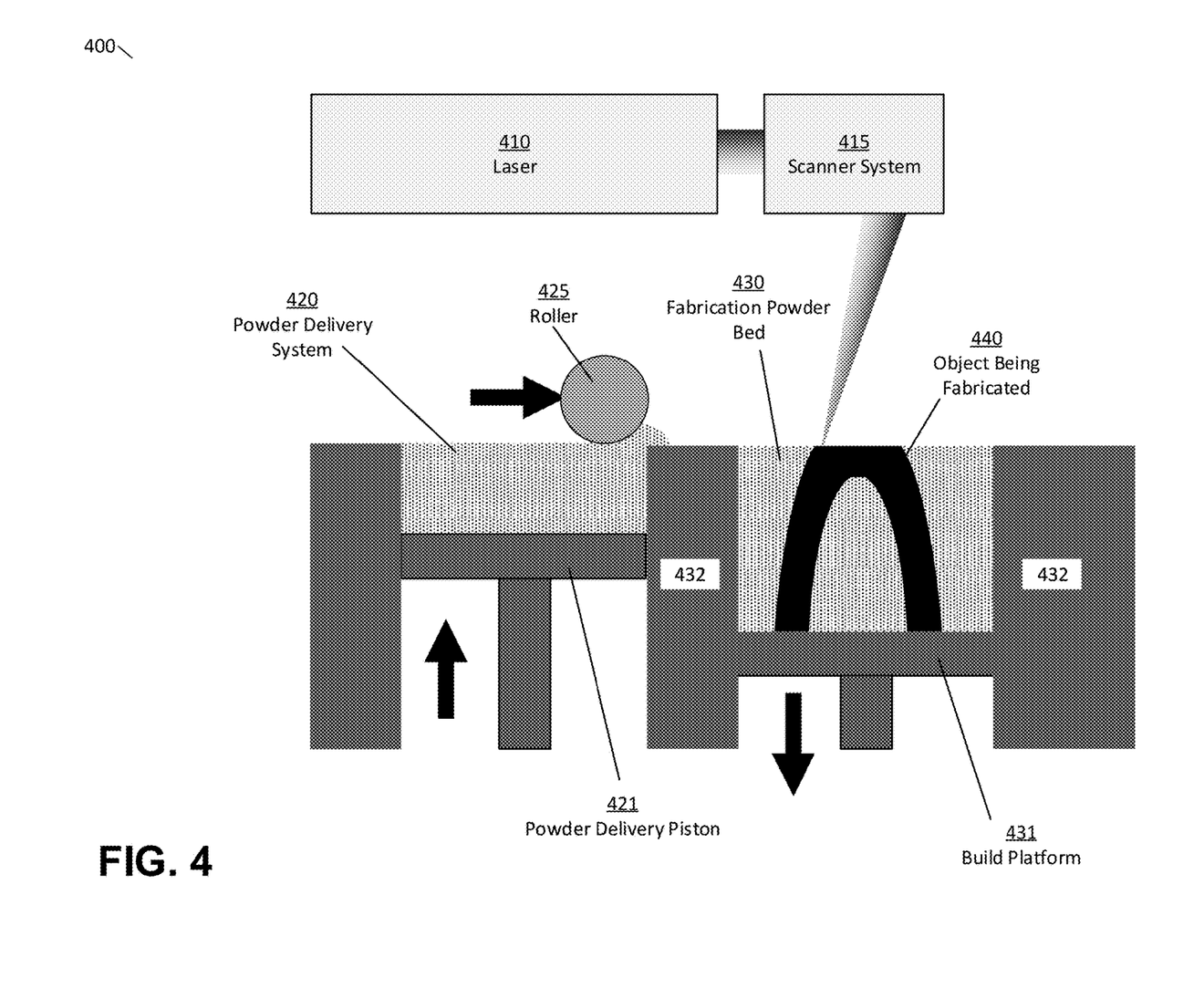
FIG. 4 depicts an illustrative selective laser sintering additive fabrication device, according to some embodiments.

FIG. 4 depicts an illustrative selective laser sintering (SLS) additive fabrication device comprising a build platform configured as per any of the embodiments discussed above. In the example of FIG. 4, SLS device 400 comprises a laser 410 paired with a computer-controlled scanner system 415 disposed to operatively aim the laser 410 at the fabrication bed 430 and move over the area corresponding to a given cross-sectional area of a computer aided design (CAD) model representing a desired part. Suitable scanning systems may include one or more mechanical gantries, linear scanning devices using polygonal mirrors, and/or galvanometer-based scanning devices.

In the example of FIG. 4, the material in the fabrication bed 430 is selectively heated by the laser in a manner that causes the powder material particles to fuse (sometimes also referred to as "sintering" or "consolidating") such that a new layer of the object 440 is formed. SLS is suitable for use with many different powdered materials, including any of various forms of powdered nylon. In some cases, areas around the fabrication bed (e.g., the walls 432, the platform 431, etc.) may include heating elements to heat the powder in the fabrication bed. Such heaters may be used to preheat unconsolidated material, as discussed above, prior to consolidation via the laser.

Once a layer has been successfully formed, the build platform 431 may be lowered a predetermined distance by a motion system (not pictured in FIG. 4). Once the build platform 431 has been lowered, the material deposition mechanism 425 may be moved across the fabrication bed 430, spreading a fresh layer of material across the fabrication bed 430 to be consolidated as described above. Mechanisms configured to apply a consistent layer of material onto the fabrication bed may include the use of wipers, rollers, blades, and/or other levelling mechanisms for moving material from a source of fresh material to a target location.

According to some embodiments, build platform 100, 120, 140 or 200, as shown in FIGS. 1A, 1B, 1C and 2A-2C, respectively, may be employed in system 400 as build platform 431. In some embodiments, the build platform 431 may be removable from the system 400.

Since material in the powder bed 430 is typically only consolidated in certain locations by the laser, some material will generally remain within the bed in an unconsolidated state. This unconsolidated material is sometimes referred to as a "part cake." In some embodiments, the part cake may be used to physically support features such as overhangs and thin walls during the formation process, allowing for SLS systems to avoid the use of temporary mechanical support structures, such as may be used in other additive manufacturing techniques such as stereolithography. In addition, this may further allow parts with more complicated geometries, such as moveable joints or other isolated features, to be printed with interlocking but unconnected components.

The above-described process of producing a fresh layer of powder and consolidating material using the laser repeats to form an object layer-by-layer until the entire object has been fabricated. Once the object has been fully fabricated, the object and the part cake may be cooled at a controlled rate so as to limit issues that may arise with fast cooling, such as warping or other distortion due to variable rate cooling. The object and part cake may be cooled while within the selective laser sintering apparatus, or removed from the apparatus after fabrication to continue cooling. Once fully cooled, the object can be separated from the part cake by a variety of methods. The unused material in the part cake may optionally be recycled for use in subsequent fabrication.

According to some embodiments, a computer system may be provided suitable for generating instructions to perform additive fabrication by an additive fabrication device comprising a removable build platform (e.g., build platform 100, 120, 140 or 200, as shown in FIGS. 1A, 1B, 1C and 2A-2C, respectively). The computer system may execute software that generates two-dimensional layers that may each comprise sections of the object. Instructions may then be generated from this layer data to be provided to an additive fabrication device, that, when executed by the device, fabricates the layers and thereby fabricates the object. Such instructions may be communicated to the additive fabrication device via any suitable wired and/or wireless communications connection. In some embodiments, a single housing may hold the computing device and the additive fabrication device such that the link is an internal link connecting two modules within the housing of the system.

According to some embodiments, it may be beneficial to both increase the stability and/or adhesion of a fabricated part to a build layer and to improve the removability of the part by forming a structure, known as a "raft," on the build layer (e.g., prior to forming the first layer of the body of the part). As discussed in U.S. patent application Ser. No. 14/501,967, titled "Systems and Methods of Post-Processing Features for Additive Fabrication," filed on Sep. 30, 2014, which is hereby incorporated by reference in its entirety, such a raft structure may be added to the part for fabrication and subsequently removed in post-processing steps to leave only the desired part.

In some embodiments, a computer system configured to generate instructions to perform additive fabrication may optimize a raft structure in order to increase the effectiveness of part removal via the use of a removal mechanism or other means of distorting the build layer In particular, as discussed above, the forces applied against the base of a part attached to a build layer depend in part on the relationship of the radius of curvature of a bend in the build layer and the dimension of the part base along the axis of the bend. Accordingly, in some embodiments a computer system configured to generate instructions to perform additive fabrication may generate raft structures having a length configured to be greater along the bend axis of the build platform, in order to increase the degree of force applied to the raft during the removal process.

In some embodiments, a computer system configured to generate instructions to perform additive fabrication may generate a raft structure by taking into account a desired rigidity in a direction along the axis of the bend in the build layer during removal of a part. For example, the computer system may optimize a raft structure by increasing the rigidity of the structure against bending forces in the axis of the bend in the build layer. Such increases in rigidity may advantageously increase the amount of force potentially exerted between the bend in the build layer and the raft structure attaching the part to the build layer. For instance, generation of the raft by the computer system to increase strength, such as by forming thicker regions, ribbing, or other reinforcing structures, may help to counter this tendency, particularly in instances wherein the build material may be comparatively flexible or have low tensile strength.

In some instances, it may be further advantageous to conduct post-processing steps, such as thermal or actinic post curing of "green parts," appropriate to increase material strength or other properties prior to the application of removal forces. Alternatively, in fabrication technologies utilizing multiple or variable property materials, it may be advantageous to form one or more raft layers of materials having increased rigidity and strength as compared to one or more regions of the part.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A build platform for an additive fabrication device, the build platform comprising:
   a rigid structure;
   a mounting attachment attached to an upper side of the rigid structure and configured to removably attach and detach the build platform to and from the additive fabrication device;
   a flexible layer, wherein in a first configuration of the build platform, the flexible layer conforms to a lower side of the rigid structure, and
   one or more handles configured to be actuated to apply a force to the flexible layer, thereby producing a second configuration of the build platform in which at least part of the surface of the flexible layer is deformed away from the rigid structure.

2. The build platform of claim 1, wherein the flexible layer comprises metal.

3. The build platform of claim 1, wherein the build platform returns to the first configuration when the force applied to the flexible layer by the one or more handles is no longer applied.

4. The build platform of claim 1, wherein the flexible layer is attached to the rigid structure at opposing ends of the rigid structure.

5. The build platform of claim 1, further comprising at least one mechanism configured to apply a restorative force to the flexible layer towards the rigid structure.

6. The build platform of claim 5, wherein the at least one mechanism includes one or more magnets.

7. The build platform of claim 1, wherein the one or more handles are further configured to be pushed by a user holding the build platform to deform the at least part of the surface of the flexible layer away from the rigid structure.

8. The build platform of claim 1, wherein the flexible layer is a layer of spring steel.

9. The build platform of claim 1, wherein the rigid structure comprises one or more magnets.

10. The build platform of claim 1, wherein in the second configuration of the build platform the flexible layer is buckled away from the rigid structure.

\* \* \* \* \*